May 20, 1952

J. L. BARTLETT ET AL 2,597,609

FLUID FLOW CALCULATOR

Filed Aug. 10, 1950

INVENTORS
JAMES L. BARTLETT &
JAMES R. DAVIS
BY
Holmes + Andersen
ATTORNEYS

Patented May 20, 1952

2,597,609

UNITED STATES PATENT OFFICE 2,597,609

FLUID FLOW CALCULATOR

James L. Bartlett and James R. Davis, La Crosse, Wis., assignors to The Trane Company, La Crosse, Wis.

Application August 10, 1950, Serial No. 178,738

2 Claims. (Cl. 235—84)

This invention relates generally to calculators and particularly to calculators for determining the factors of the flow of fluids in conduits and more particularly for determining the factors of the flow of air in ducts.

It is an object of this invention to provide a slide rule calculator which is inexpensive to construct and which is accurate and easy to use.

It is an object of this invention to provide a mechanical rule for determining the round duct size, rectangular duct size, the air volume, the air friction, and the air velocity by a single setting of the slide rule to any two of the above factors one of which must be either the duct size or the air volume.

It is another object of this invention to provide a mechanical rule for determining rectangular ducts of various major and minor axes which are equivalent to a given round duct and vice versa.

It is another object of this invention to provide a stop member for limiting adjustment of the device to the effective range of movement.

Other objects and advantages will appear as the specification proceeds to describe the invention with reference to the accompanying drawings, in which—

Figure 1:
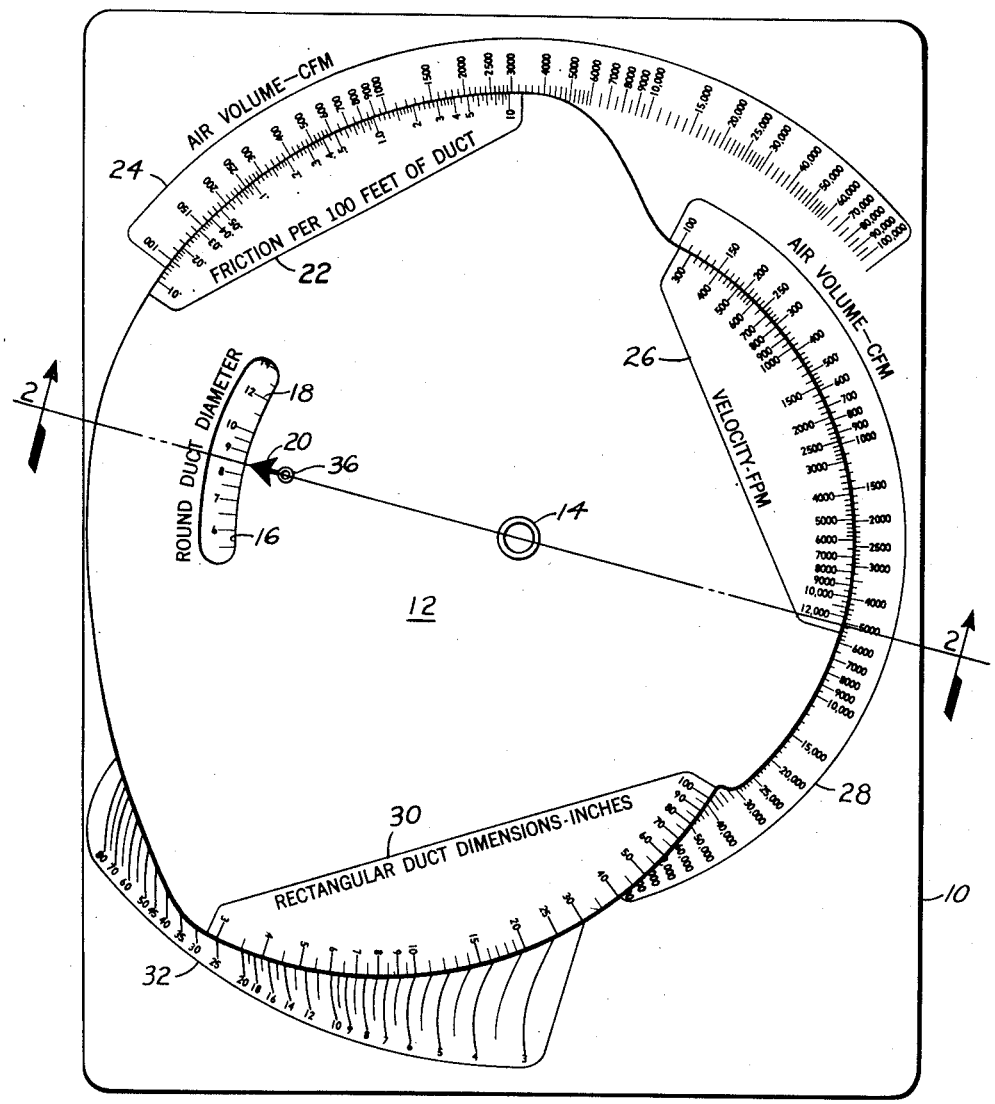
Fig. 1 is a plan view of the slide rule calculator of this invention.
Figure 2:
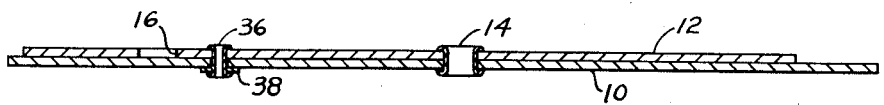
Fig. 2 is a cross-sectional view taken on the line 2—2 of Fig. 1.
Figure 3:
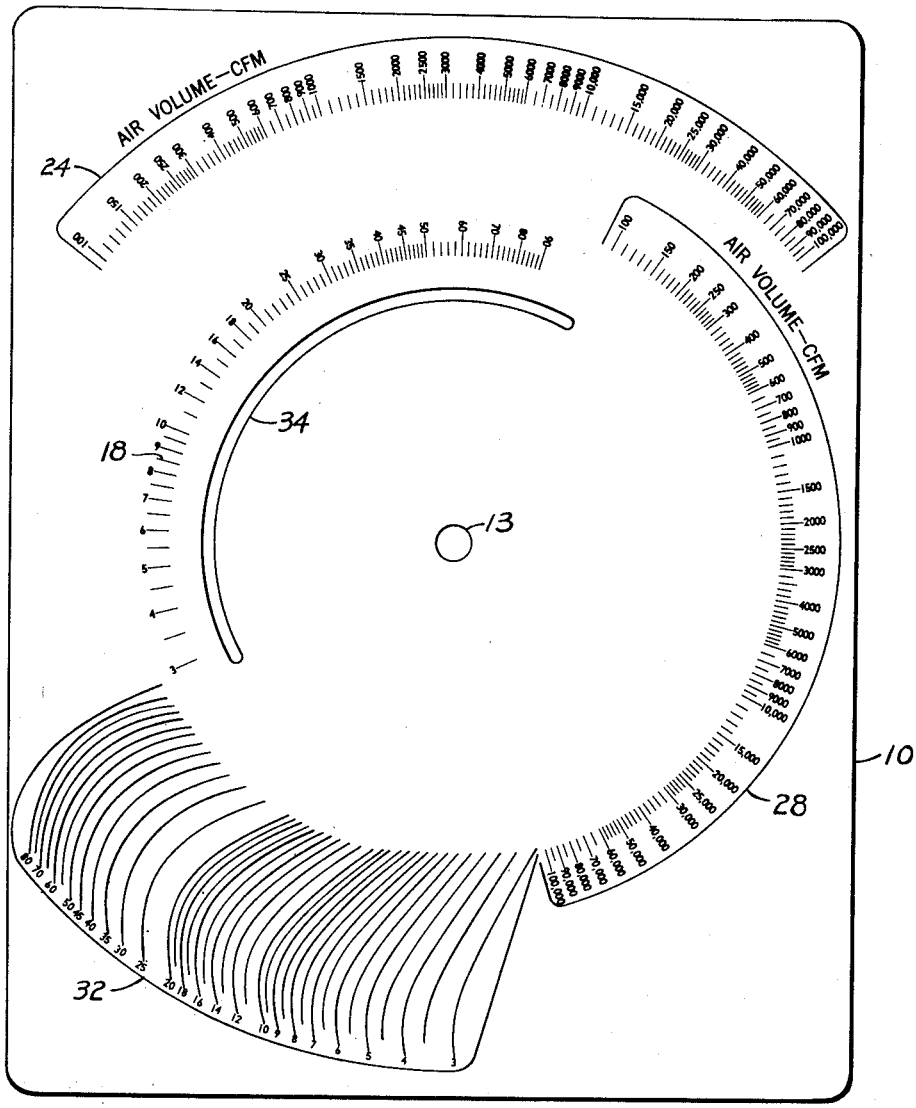
Fig. 3 is a view of the base member of the slide rule calculator.

Referring now to Fig. 1, a base member 10 has an indexable member 12 rotatably secured thereon by a rivet 14 which extends through the members 10 and 12 near their geometric centers. Base member 10 has a hole 13 for receiving rivet 14.

Indexable member 12 has an arcuate slot 16 therein having its arcuate center on the pivotal axis of indexable member 12. The slot 16 need not be arcuate in shape, because it functions merely to permit observation of a portion of base member 10. An arcuate logarithmic scale 18 of round duct diameters in inches is printed on the base member 10 on a radius from the pivotal axis such that the scale 18 appears through the arcuate slot 16 in indexable member 12. An indicating arrow 20 is printed on member 12 at or near the center of one edge of the arcuate slot 16. It is preferred to locate the arrow on the inner edge of the arcuate slot 16. An arcuate logarithmic scale 22 of duct friction in inches of water per 100 feet of duct is printed on the periphery of indexable member 12 and registers with scale 24 printed on base member 10. Scale 24 is an arcuate logarithmic scale of air volume in cubic feet per minute. Scales 22 and 24 are both constructed with the pivotal axis of indexable member 12 as a center.

An arcuate logarithmic scale 26 of velocity in feet per minute is printed on the periphery of indexable member 12 and registers with scale 28 printed on base member 10. Scale 28 is an arcuate logarithmic scale of air volume in cubic feet per minute. Scales 26 and 28 are constructed with the pivotal axis of indexable member 12 as a center.

An arcuate scale 30 of rectangular duct dimensions in inches is printed on the periphery of indexable member 12. The arcuate scale 30 has a center which is spaced from the pivotal axis of member 12. The scale 30, therefore, sweeps over the face of member 10. A scale 32 of rectangular duct dimensions is printed on base member 10. Scale 32 has long division lines to register with the scale 30 throughout its range of pivotal movement.

Base member 10 has an arcuate slot 34. A rivet 36 is fastened to member 12 and extends into the slot 34 in member 10. The rivet 36 has a washer 38 to prevent disengagement of the rivet from member 10. The movement of the rivet 36 is limited by the slot 34 and consequently the pivotal movement of the indexable member 12 with respect to the base member 10 is also limited.

In constructing the calculator the following symbols are used in the calculations:

F—Friction in inches of water per 100 ft. of duct length.
V—Velocity in feet per minute.
Q—Quantity in cubic feet per minute.
d—Diameter of round duct in inches.
a—Rectangular duct dimension in inches.
b—Rectangular duct dimension in inches.

From experimentation the following relationship is found to exist.

(1) $$F=\frac{2.68}{d^{1.22}}\left(\frac{V}{1000}\right)^{1.90}$$

The formula for flow in a duct is given below:

(2) $$Q=\frac{\pi d^2 V}{(4)(144)}$$

Combining Equations 1 and 2 and taking the logarithm of both sides of the combined equations, (3) $\log d = .378 \log Q - .199 \log F - .193$ Taking the logarithm of both sides of Equation 2 results in Equation 4.

(4)  Log $d = \frac{1}{2} \log Q - \frac{1}{2} \log V + \frac{1}{2} \log 183$

A logarithmic scale 18 for $d$ is laid out on the base member 10 and the indicating arrow 20 is marked on the indexable member 12. Scales 26(V) and 28(Q) are then constructed. From Equation 4 it is found that the angle subtended by a logarithmic cycle on scales 26(V) and 28(Q) must be one half the angle subtended by a logarithmic cycle on scale 18($d$) because the coefficients of log Q and log V are both ½ of the coefficient of log $d$ in Equation 4.

Scales 22 and 24 are now constructed. From Equation 3 it is found from the coefficients of the terms, that the angle subtended by a cycle on scale 22(F) must be .199 times the angle subtended by a cycle on scale 18($d$) and the angle subtended by a logarithmic cycle on scale 24(Q) must be .378 times the angle subtended by a logarithmic cycle on scale 18($d$). The scales 22 and 24 may be constructed on a different radius than that of scale 18($d$) provided that the angles subtended by the logarithmic cycles of the scales bear the relationship required by the coefficients of the terms of Equation 3. It should also be understood that scale 22 could be on member 10 and scale 24 on member 12 if desired. Scales 26 and 28 could also be interchanged between members 10 and 12 if desired.

In determining the angular position of scale 22 with respect to the indicating arrow 20 for a given angular position of the scale 24, it is only necessary to adjust the member 12 so that the indicating arrow 20 is opposite a value for $d$ on scale 18 and to then angularly position the scale 22 on member 12 so that Equation 3 is satisfied. The angular location of scale 26 on indexable member 12 is determined in like manner using Equation 4.

The scales 30 and 32 are determined by the following formula:

(5)  $$d = \frac{1.30(ab)^{0.625}}{(a+b)^{0.25}}$$

Scale 30 is arbitrarily laid out on the arc of a circle having a center spaced from the axis of rotation of indexable member 12. The locations of points on the division lines of scale 32 are then calculated for various values of ($d$) until the division lines of scale 32 can be plotted.

It is evident from the above description that the calculator of this invention determines the round duct size, the rectangular duct size, the air volume, the air friction, and the air velocity by a single setting of the indexable member to any two of the above factors one of which must be either the duct size or the air volume.

The calculator may be used for calculating rectangular ducts which are equivalent to a given diameter of circular duct and vice versa.

While we have described the foregoing preferred embodiments of our invention, we contemplate that many changes may be made without departing from the scope and spirit of our invention and we desire to be limited only by the claims.

We claim:

1. A fluid flow calculator comprising a base member, an indexable member, means pivotally mounting said indexable member on said base member, a first fluid volume scale on one of said members, a fluid friction scale on the other of said members from that having said first fluid volume scale, said fluid friction scale registering with said first fluid volume scale, a second fluid volume scale on one of said members, a fluid velocity scale on the other of said members from that having said second fluid volume scale, said fluid velocity scale registering with said second fluid volume scale, a first scale of rectangular duct dimensions on one of said members, the division lines of said first scale of rectangular duct dimensions being curved, a second scale of rectangular duct dimensions on a portion of the periphery of the other of said members from that having said first scale of rectangular duct dimensions, said portion of the periphery of the other of said members having throughout its length progressively increasing radii with respect to said pivotally mounting means, a scale of circular duct dimensions on one of said members and indicating means on the other of said members from that having said scale of circular ducts dimensions, said indicating means registering with said scale of circular duct dimensions, each of said scales being proportioned and being positioned with respect to each other and with respect to said indicating means according to a mathematical relationship for fluid flow.

2. A fluid flow calculator comprising a base member, an indexable member, means pivotally mounting said indexable member on said base member, a first fluid volume scale on one of said members and a fluid friction scale on the other of said members registering with said first fluid volume scale, a second fluid volume scale on one of said members and a fluid velocity scale on the other of said members registering with said second fluid volume scale, a scale of circular duct dimensions on one of said members and indicating means on the other of said members registering with said scale of circular duct dimensions, a first scale of rectangular duct dimensions on said base member, the division lines of said first scale of rectangular duct dimensions being curved, a portion of the periphery of said indexable member conforming substantially to an arc of a circle offset from the pivotal axis of said indexable member, a second scale of rectangular duct dimensions on said portion of the periphery of said indexable member and registering with said first scale of rectangular duct dimensions, said indicating means and each of said scales being positioned and proportioned with respect to each other according to a mathematical relationship for fluid flow.

JAMES L. BARTLETT.
JAMES R. DAVIS.

REFERENCES CITED

The following references are of record in the file of this patent:

UNITED STATES PATENTS

| Number | Name | Date |
|---|---|---|
| 2,393,922 | McDowell | Jan. 29, 1946 |

OTHER REFERENCES

"Special Slide Rules," by J. N. Arnold, pages 18–19; published by Purdue University, La Fayette, Indiana, September 1933.